2,758,868
PIE LIFTER

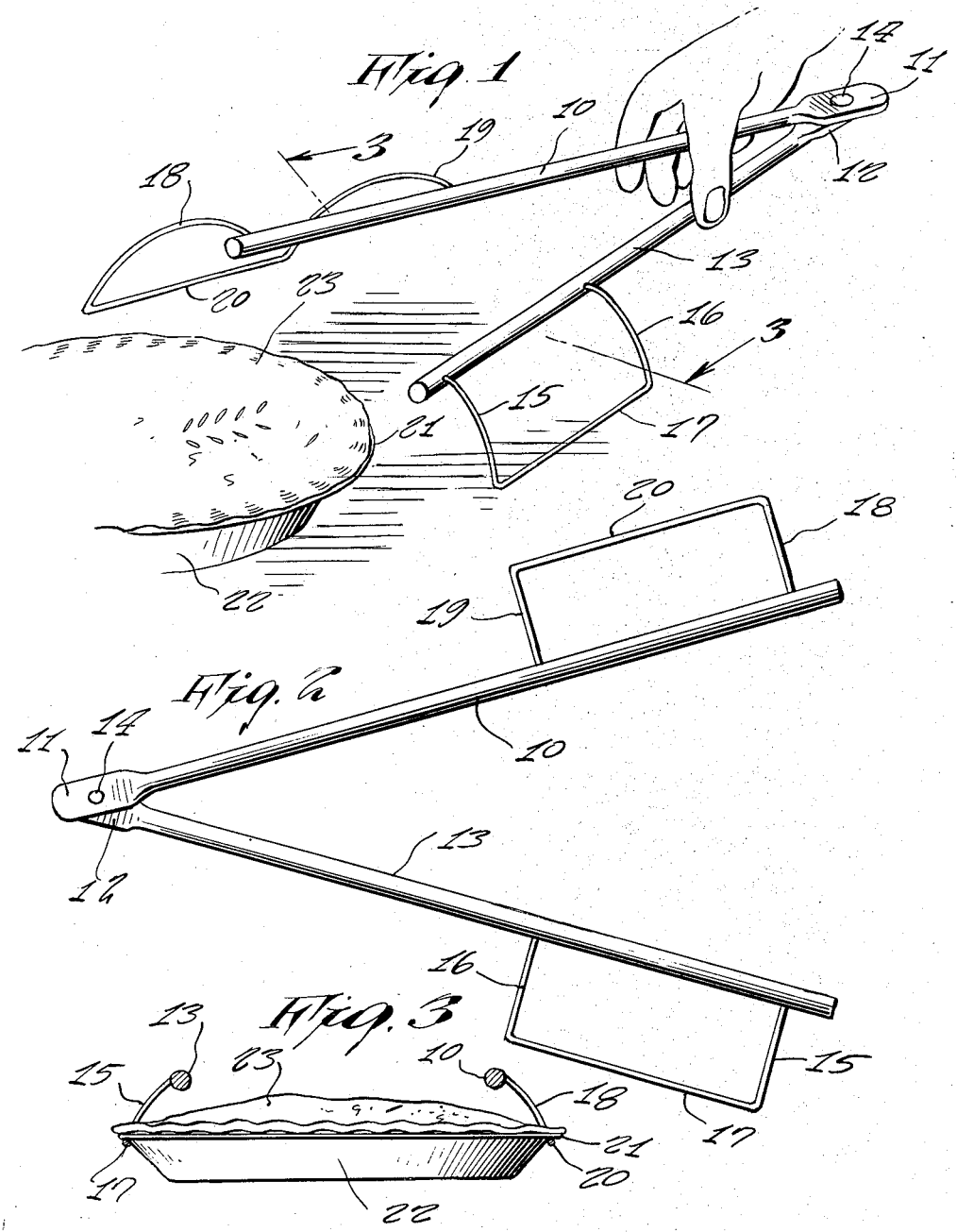

Alma Heintzelman, Milford, Conn.

Application July 6, 1953, Serial No. 366,213

1 Claim. (Cl. 294—31)

This invention relates to pie lifters.

It is an object of the present invention to provide a pie lifter adapted to be used for removing pies from an oven one at a time, the pie lifter fitting over the top of the pie and under the rim of a pie plate.

It is another object of the present invention to provide a pie lifter which makes unnecessary the removal of front pies in an oven in order to lift out the rear pies, the present invention permitting the user to reach over the top of the frontmost pies and grip the rim of the rearmost pie pan desired.

Other objects of the present invention are to provide a pie lifter bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view of a pie lifter embodying the features of the present invention and shown in operative use;

Fig. 2 is a top plan view thereof; and

Fig. 3 is a vertical sectional view taken along the line 3—3 of Fig. 1 and showing the pie pan being held by the device.

Referring now to the figures, 10 represents an elongated cylindrical wooden handle having an enlarged flattened end 11 which is rotatably connected to the enlarged flattened end 12 of a second elongated cylindrical wooden handle 13 by means of a pin 14.

A three-sided wire grid having arcuately shaped sides 15 and 16 and a straight longitudinal side 17 is suitably secured at the ends of the arcuate sides 15 and 16 to the outer face of the handle 13 at the end remote from the enlarged portion 11. A second three-sided wire grid comprising arcuate sides 18 and 19 and a straight longitudinal side 20 is likewise suitably secured to the outer face of the handle 10 at the end thereof remote from the enlarged portion 11.

As shown in Fig. 1, the handles 10 and 13 are gripped intermediate the wire grids and the pin 14 and brought together so that the wire grids pass under the rim 21 of the pie plate 22 supporting pie 23, as shown in Fig. 3. By continuing the inward pressure on the handles 10 and 13, the pie plate 22 will be securely held and prevented against forward displacement by the arcuate sides 15 and 18 and against rearward displacement by the arcuate sides 16 and 19 of the wire grids. It will be noted that the handles 10 and 13 and the arcuate sides of the wire grids pass up over the top of the pie 23 in freely spaced relationship.

The pie lifter is particularly adapted for removing pies one at a time from an oven and permits the removal of the rearmost or innermost pies without having to first remove the frontmost or outer pies. It is particularly excellent for a high meringue pie, which is always difficult to handle. Not only is it possible to remove the pies one at a time, by passing the pie lifter over the tops of the frontmost pies, but the use of the device also avoids finger contact with the hot pie plate 22 as well as damage to the pie 23. It will also be noted that the plate 22 is secured in an extremely firm manner as long as tension is applied to the handles 10 and 13, it being impossible for the pie plate 22 to fall outwardly from the lifter in either a front or rear direction due to the arcuate portions of the wire grids or to drop vertically due to the longitudinal portions.

While various changes may be made in the detail construction, it shall be understood that such changes shall be within the spirit and scope of the present invention, as defined by the appended claim.

Having thus set forth and disclosed the nature of my invention, what is claimed is:

A lifting device comprising a pair of elongated handles having flattened and enlarged ends, a pin pivotally connecting said flattened enlarged ends and one of a pair of wire grips connected to the outer face of each of said handles at their free ends, each of said wire grips comprising a pair of parallel arcuate end portions secured to and extending outwardly at right angles to said handles and downwardly therefrom and connected at their outermost extremities by a straight longitudinal side member substantially parallel to and disposed below said handles, said longitudinal side being the outermost portion of each said handle and being adapted to engage the undersurface of a pie plate rim or the like when said handles are squeezed together, said arcuate sides extending upwardly across the top of the pie in freely spaced relationship thereto, said wire grips being aligned laterally with each other.

References Cited in the file of this patent

UNITED STATES PATENTS

| | | |
|---|---|---|
| 420,546 | Pettit | Feb. 4, 1890 |
| 845,771 | Fisk | Mar. 5, 1907 |
| 1,228,420 | Eden | June 5, 1917 |
| 1,316,157 | Hossfeld | Sept. 16, 1919 |
| 1,522,389 | Roider | Jan. 6, 1925 |
| 1,588,774 | Sallac | June 15, 1926 |
| 2,023,521 | Furnas | Dec. 10, 1935 |